US006633843B2

United States Patent
Gong

(10) Patent No.: US 6,633,843 B2
(45) Date of Patent: Oct. 14, 2003

(54) LOG-SPECTRAL COMPENSATION OF PMC GAUSSIAN MEAN VECTORS FOR NOISY SPEECH RECOGNITION USING LOG-MAX ASSUMPTION

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 377 days.

(21) Appl. No.: 09/843,683

(22) Filed: Apr. 27, 2001

(65) Prior Publication Data

US 2002/0013697 A1 Jan. 31, 2002

Related U.S. Application Data

(60) Provisional application No. 60/210,320, filed on Jun. 8, 2000, and provisional application No. 60/222,295, filed on Aug. 1, 2000.

(51) Int. Cl.$^7$ .............................................. G10L 15/20
(52) U.S. Cl. ...................................... 704/233; 704/228
(58) Field of Search ................................. 704/228, 233

(56) References Cited

U.S. PATENT DOCUMENTS 6,188,982 B1 * 2/2001 Chiang ....................... 704/256

OTHER PUBLICATIONS

M. J. F. Gales and S. J. Young, "HMM recognition in noise using Parallel Model Combination", Proc. Eurospeech 1993, Berlin, vol. II, p. 837–840, 1993.*
R. Yang, M. Majaniemi, and P. Haavisto, "Dynamic parameter compensation for speech recognition in noise", Proc. IEEE ICASSP 1995, Detroit, p. 469–472.*

M. J. F. Gales, "'NICE' model–based compensation schemes for robust speech recognition" in Proc. ESCA–NATO Workshop on Robust Speech Recognition for Unknown Communication Channels, Pont–a–mousson, France, p. 55–64, Apr. 1997.*
C. J. Leggetter and P. C. Woodland, "Maximum likelihood linear regression for speaker adaptation of continuous density HMM," Computer Speech and Language, vol. 9, No. 2, p. 171–185, 1995.*
Mark J.F. Gales et al., "Robust Continuous Speech Recognition Using Parallel Model Combination" IEEE Transactions on Speech and Audio Processing, vol. 4, No. 5, pp. 352–359, Sep. 1996.

* cited by examiner

Primary Examiner—Tālivaldis Ivars Šmits
(74) Attorney, Agent, or Firm—W. James Brady, III; Frederick J. Telecky, Jr.

(57) ABSTRACT

Reducing mismatch between HMMs trained with clean speech and speech signals recorded under background noise can be approached by distribution adaptation using parallel model combination (PMC). Accurate PMC has no closed-form expression, therefore simplification assumptions must be made in implementation. Under a new log-max assumption, adaptation formula for log-spectral parameters are presented, both for static and dynamic parameters. The system takes the mean vector (41) made up of the static part (41a) and the dynamic part (41b) and the noise vector (43) made up of the static part (43a) and dynamic part (43b) and applies to a decision circuit (45) to determine if the quiet vector plus the gain of speech produced in noise with respect to clean speech is greater than the noisy mean vector and if so the static part is equal to the gain plus the clean speech vector and the dynamic part is the change in the the quiet speech vector and if not greater than the noise vector then the static part equals the noise vector and the dynamic part is zero.

5 Claims, 1 Drawing Sheet

LOG-SPECTRAL COMPENSATION OF PMC GAUSSIAN MEAN VECTORS FOR NOISY SPEECH RECOGNITION USING LOG-MAX ASSUMPTION

This application claims priority under 35 USC 119 (e)(1) of provisional application Nos. 60/210,320, filed Jun. 8, 20000 and 60/222,295 filed Aug. 1, 2000.

FIELD OF INVENTION

This invention relates to speech recognition and more particularly to compensation of Gaussian mean vectors for noisy speech recognition.

BACKGROUND OF INVENTION

A speech recognition system comprises a recognizer for comparing input speech to speech models such as Hidden Markov Models (HMMs) as illustrated in FIG. 1. The recognition system is often called upon to operate in noisy environments such as in a car with all the road sounds. Speech model such as Hidden Markov Models (HMMs) are often trained in a quiet environment. It is therefore desirable to take a set of speech models (HMM) trained with speech collected in a quiet environment and to recognize speech utterances recorded in a noisy background. In such case a mismatch exists between the environments of models and the utterances. The mismatch may degrade substantially recognition performance. (See Y. Gong. Speech recognition in noisy environments: A survey. *Speech Communication,* 16(3):261–291, April 1995.) This problem is of importance in applications where it is too expensive to collect training speech in the noisy environment, or the changing nature of the noisy background makes it impossible to have a collection covering all situations.

Hands-free speech recognition in automobile is a typical case. Parallel model combination (PMC) can be used to reduce the mismatch. (See M. J. F. Gales and S. J. Young. HMM recognition in noise using parallel model combination. *In Proceedings of European Conference on Speech Communication and Technology,* volume II, pages 837–840, Berlin,1993.) PMC uses the HMM distribution of clean speech models and the noise distribution to give a maximum likelihood estimate of the corrupted-speech models. FIG. 2 illustrates the process of obtaining a "noisy" HMM by taking an original quiet HMM and modifying the models to accommodate the noise as illustrated in FIG. 2 to get "noisy" HMM.

Two advantages of PMC can be mentioned. Firstly, no speech data is required for compensation. Secondly, all the models are individually compensated.

As accurate PMC has no closed-form expression, simplification assumptions must be made in implementation. The results can be directly applied to feature parameters linearly transformed from log-spectral parameters, such as MFCC (by DCT) and PFV3B (by KLT).

PMC adaptation of dynamic parameters (i.e., ∩MFCC) can be approached from two different directions. In a first direction a mismatch function for (difference-based) dynamic parameters is established. (See M. J. F. Gales and S. J. Young. Robust continous speech recognition using parallel model compensation. *IEEE Trans. on Speech and Audio Processing,* 4:352–359, 1996.) It can be shown that the adapted dynamic parameters at time t are a function of static parameters at time t-w an undesired requirement for practical applications. Besides, the results doesn't apply to dynamic parameters obtained by linear-regression. A solution to this problem which sums up several difference-based compensated dynamic parameters has been proposed. (See R. Yang, M. Majaniemi, and P. Haavisto. Dynamic parameter compensation for speech recognition in noise. In *Proc. of IEEE Internat. Conf. on Acoustics, Speech and Signal Processing,* pages 469–472, Detroit, 1995.) However, only little improvement due to dynamic coefficients were reported.

In the second direction a continuous time derivative of static parameters as dynamic parameters is used. (See M. J. F. Gales. "nice" model-based compensation schemes for robust speech recognition. In Proc. ESCA-NATO Workshop on *Robust speech recognition for unknown communication channels,* pages 55–64, Pont-a-mousson, France, 1997.) This is an approximation to the discrete nature of dynamic parameters. We will pursue this direction in this teaching and application.

PMC deals with Gaussian distributions. Referring to FIG. 3 there is illustrated the Gaussian distribution made up of the mean vector and covariance matrix parameters for the 1-dimentional case. The larger the width the larger the covariance value. In theory we need to modify both the mean vector and the covariance matrix. Although theoretically changing both is desirable it has been determined that changing the mean vector is enough. In a second prior art assumption and in the assumption according to the present invention nothing is done with respect to covariance. In PMC, an independent noise model is estimated from noise samples collected in the new environment. Distribution by distribution, clean speech model and the noise model are then combined using a mismatch function, to obtain a corrupted speech model matched to the new environment. The mismatch function assumes that speech and noise are independent and additive in the time domain. The mismatch function for computing the mean of the corrupted model in the log DFT domain has the form:

$$\hat{\mu}^{log}=E\{\log(\exp(\mu^{log}+h^{log}+\exp(\mu^{log})) \quad (1)$$

where $\mu^{log}$ and $\mu^{log}$ represent speech and noise observations in the log DFT domain and their statistics are obtained from appropriate speech and noise state pair. $h^{log}$ is a convolutive (in time domain) noise representing channel, transducer and some speaker characteristics, which will be omitted in this study. The value in equation 1 is in the log scale. Reading the equation 1 it states the combined expectance (average) is the sum. The log domain is converted into the linear scale by the exponentiation of both speech and noise. The speech and noise are then linear terms. They are added together. The log is taken again. The expectation is then taken over the result. Since Eq-1 does not have a closed form, this can not be calculated because the formula is too complicated. This needs to be simplified. Approximations have been used, which allows trading-off between accuracy and hardware requirement: In the prior art is the log-normal approximation and the log-add approximation. In the following sections, we will derive PMC formula for each of the two prior art cases, with the notation:

$\hat{X}$ denotes estimate (adapted value) of parameters X, $\tilde{X}$ denotes parameters X of noise.

lin for linear domain parameters, log for log spectral domain.

In the prior art are two assumptions for the adaptation of log-spectrial parameters. They are the log-normal approximation and the log-add approximation. The mean vector has two parameters. They are the static parameter and dynamic parameter. The dynamic parameter is the time derivative of the static parameter.

The log-normal approximation for the static parameter is based on the assumption that the sum of two log-normally distributed random variables is itself log-normally distributed. In the linear domain, the mean of the compensated model is computed as $$\hat{\mu}_i^{lin} = g\mu_i^{lin} + \tilde{\mu}_i^{lin} \quad (2)$$

$$\hat{\Sigma}_{i,j}^{lin} = g^2 \Sigma_{i,j}^{lin} + \tilde{\Sigma}_{i,j}^{lin} \quad (3)$$

where i, j are indices for the feature vector dimension, and g accounts for the gain of speech produced in noise with respect to clean speech and, for speech and noise:

$$\mu_i^{lin} = \exp\left(\mu_i^{log} + \frac{1}{2}\Sigma_i^{log}\right) \quad (4)$$

$$\Sigma_{i,j}^{lin} = \mu_i^{lin}\mu_j^{lin}\left[\exp(\Sigma_{i,j}^{log}) - 1\right] \quad (5)$$

The adapted mean and variance in log domain can be obtained by inverting the above equations:

$$\mu_i^{log} = \log(\mu_i^{lin}) - \frac{1}{2}\log\left(\frac{\Sigma_{i,i}^{lin}}{(\mu_i^{lin})^2} + 1\right) \quad (6)$$

$$\Sigma_{i,j}^{log} = \log\left(\frac{\Sigma_{i,j}^{lin}}{\mu_i^{lin}\mu_j^{lin}} + 1\right) \quad (7)$$

Dynamic parameter

To derive the adaptation equation for dynamic parameters under the log-normal approximation, we further assume that in average:

$$\frac{\partial \tilde{\mu}_i^{lin}}{\partial t} = 0. \quad (8)$$

Following the idea presented in equation 2 of the static part, the adapted dynamic log-spectral vector is:

$$\Delta\hat{\mu}_i^{log} \triangleq \frac{\partial \hat{\mu}_i^{log}}{\partial t} = g\frac{\beta_i}{\beta_i+1}\frac{\partial_i+2}{\partial_i+1}\Delta\mu_i^{log} \quad (9)$$

where $$\alpha_i \triangleq \frac{(\hat{\mu}_i^{lin})^2}{\hat{\Sigma}_i^{lin}}, \quad (10)$$

$$\beta_i \triangleq \frac{\mu_i^{lin}}{\tilde{\mu}_i^{lin}}, \quad (11)$$

is the signal-to-noise ratio (in linear scale), and, finally, $$\Delta\mu_i^{log} \triangleq \frac{\partial \mu_i^{log}}{\partial t} \quad (12)$$

This assumption allows to adapt covariance matrix. However, it requires the conversion of covariance matrix into linear DFT domain, which is computationally expensive.

Is the dynamic parameter of the clean model.

The log-add approximation is based on the assumption that the effect of variance of both speech and noise on the estimate can be ignored so the variance is set to equal zero as:

$$\Sigma_{i,j}=0. \quad (13)$$

Taking the logarithm of Eq-2, we have:

$$\hat{\mu}_i^{log}=\log(g\exp(\mu_i^{log})+\exp(\mu\mu_i^{log})) \quad (14)$$

For dynamic parameter:
Applying Eq-13 to Eq-9, we have:

$$\Delta\hat{\mu}_i^{log} = g\frac{\beta_i}{\beta_i+1}\Delta\mu_i^{log} \quad (15)$$

Notice that BI is the SNR in linear scale.

This assumption needs conversion between lo and linear scales, which is expensive for certain applications.

The existing solutions to dynamic feature compensation either can only deal with difference-based features, require additional storage, deal with regression-based dynamic features by ad-hoc combination of difference-based features, do not use variance information or do not give simplified solution for limited resources. While log-add approximation, with dynamic parameters or not gives comparable results than log-normal at a substantially lower computational cost it is further desirable to reduce even further the computational cost and storage cost. This is particularly true in a wireless environment where the memory space is very limited.

SUMMARY OF INVENTION

In accordance with one embodiment of the present invention a third assumption is provided for adaptation of the log-spectral parameters for both static and dynamic parameters that uses a continuous time derivative of static parameters as dynamic parameters and wherein a log-maximum approximation is used.

DESCRIPTION OF PREFERRED EMBODIMENT

Figure 1:
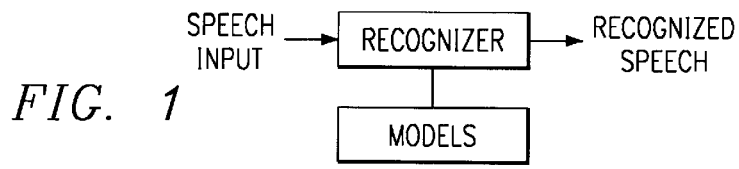
FIG. 1 is a block diagram of a typical recognizer.
Figure 2:
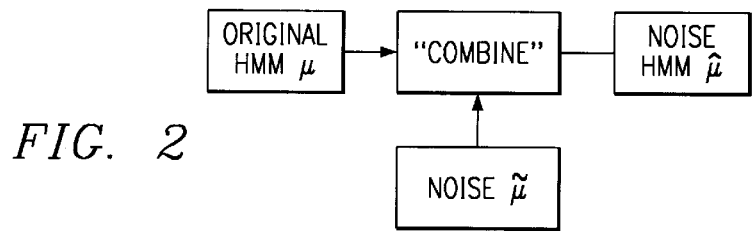
FIG. 2 is a block diagram illustrating speaker adaptation.
Figure 3:
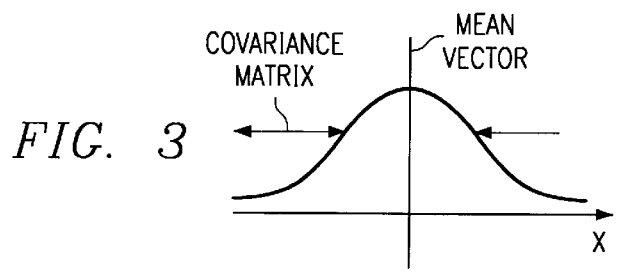
FIG. 3 illustrates a Gaussian distribution with covariance matrix and mean vector.

In accordance with the present invention a new and third log-max assumption is made that substantially reduces the processing requirement with no conversion between log and linear scale and yet does not significantly affect the outcome. It is pointed out for the static parameter that:

$$(\log(g\ \exp(a)+\exp(b))\approx \log\ g+a\ \text{if}\ a>>b \quad (16)$$

and $$\log(g\ \exp(a)+\exp(b))\approx \log\ b\ \text{if}\ b>>a \quad (17)$$

Under log-max approximation teaching herein this is applied to our problem where a is speech mean vector—and b is noise mean vector—; Eq-14 can be approximated by:

$$\hat{\mu}_i^{\log}=\max\ (\log\ g+\mu_i^{\log},\tilde{\mu}_i^{\log}) \quad (18)$$

This transformation is performed totally in the log domain and hence is fast, though less accurate. It can be shown that the maximum error compared to log-add is log(2).

Taking the time derivative of Eq-18 for the dynamic parameter, we obtain:

$$\Delta \hat{\mu}_i^{\log} = \Delta \mu_i^{\log}\ \text{if}\ \log g + \mu_i^{\log} > \tilde{\mu}_i^{\log} \quad (19)$$

$$= \Delta \tilde{\mu}_i^{\log}\ \text{otherwise.} \quad (20)$$

If we use the assumption Eq-8 (noise is stationary), then the result is even simpler:

$$\Delta \hat{\mu}_i^{\log} = \Delta \mu_i^{\log}\ \text{if}\ \log g + \mu_i^{\log} > \tilde{\mu}_i^{\log} \quad (21)$$

$$= 0 \quad \text{otherwise.} \quad (22)$$

Figure 4:
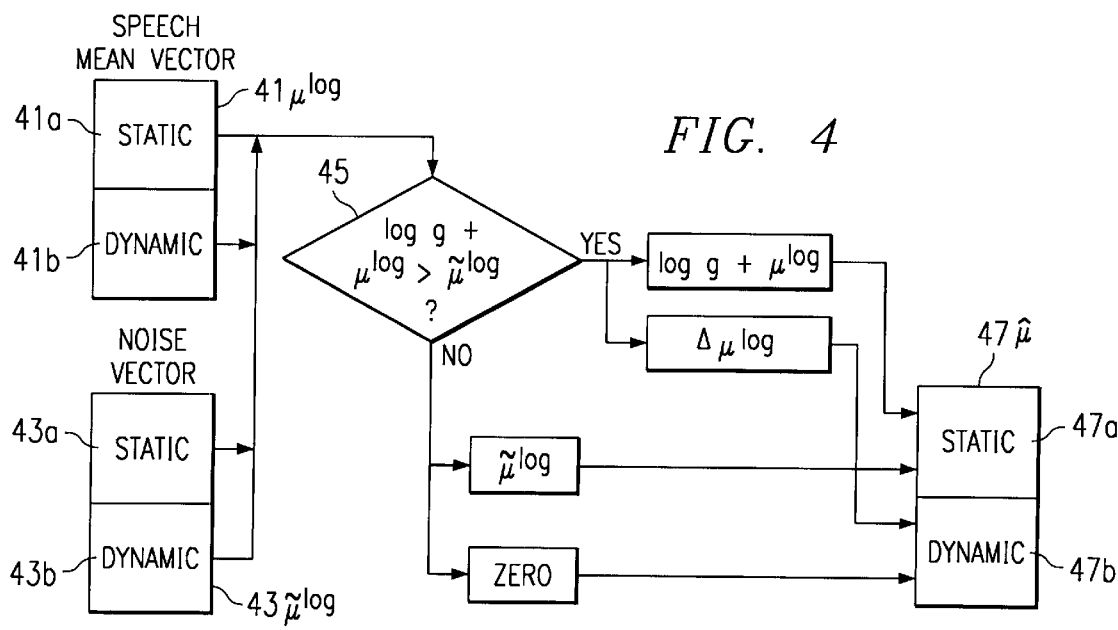
FIG. 4 is a block diagram of a system for log-spectral compensation of mean vector for noisy recognition according to one embodiment of the present invention.

Referring to FIG. 4 there is illustrated the system of the log-spectral compensation of Gaussian mean vector using the log-maximum assumption. Only the mean vector is used so the system takes the mean speech vector 41 made up of the static part 41a and the dynamic part 41b and the noise vector 43 made up of the static part 43a and the dynamic part 43b are applied to the same equation 18 at decision block 45 to determine $\log\ g+\mu^{\log}$ is greater than (>) $\mu^{\log}$ and if so the static part is equal to $\log\ g+\mu^{\log}$ and for the dynamic parameter is $\Delta\mu^{\log}$. In this case the value of $\log\ g+\mu^{\log}$ is provided as the static part 47a of the combined "noisy" HMM and the value $\Delta\mu^{\log}$ is provided as the dynamic part 47b. If not greater than $\mu^{\log}$ then the static equals $\mu^{\log}$ and the dynamic is zero. In this case the value of $\mu^{\log}$ is provided as the static part 47a of the combined "noisy" HMM and the value of zero is provided as the dynamic part 47b. There is only one comparison or test and there are two outputs. This greatly simplifies any the operation and eliminates the costly computation. This allows the operation to be performed simply on a DSP for example without the need for an expensive microprocessor.

To satisfy real-time adaptation requirement, we developed an on-line version of model combination scheme, referred to as on-line model combination (OMC). During speech pause, OMC procedure adapts a fraction of HMM distributions with a newly estimated noise statistics. Two extreme cases can be possible: only one Gaussian distribution is adapted at each sample frame, or whole set of Gaussians is adapted. OMC can use either of the above-mentioned assumptions, based on available computational resource. Noise estimation is based on a modified MAP estimation of noise mean and variance.

To test the effectiveness of the invention, experiments have been performed.

The TI-digits database, down-sampled to 8 kHz, is used for all the experiments. The digit sequences have 1–7 digits.

The training set consists of 4229 digit sequences (13896 words) from the male speakers and 4385 digit sequences (14400 words) from the female speakers.

The test set consists of 113 speakers, 57 of which are female speakers and 56 are male speakers. The test set consists of 3747 digit sequences (10225 words) from male speakers and 3815 digit sequences (10412 words) from the female speakers.

The additive noise used in the experiments is TI-FRANCE car noise. The noise was scaled and added to the test and adaptation data to simulate 0dB signal-to-noise ratio (SNR) conditions.

TABLE 1

WER as function of model combination assumption type and of parameter type. No variance adaptation. 0dB SNR, 20637 words (7562 strings) tested. SER: string error rate, WER: word error rate, RD: WER reduction from S to S + D.

| Type | LPC-MFCC-13 | | | DFT-MFCC-10 | | | DFT-MFCC-13 | | |
|---|---|---|---|---|---|---|---|---|---|
| | S | S + D | RD % | S | S + D | RD % | S | S + D | RD % |
| Log-max WER | 1.25 | 0.99 | 20.8 | 1.59 | 1.06 | 33.3 | 1.28 | 0.91 | 28.9 |
| Log-max SER | 3.13 | 2.47 | 21.1 | 3.97 | 2.74 | 31.0 | 3.27 | 2.29 | 30.0 |
| Log-add WER | 1.10 | 0.87 | 20.9 | 1.44 | 0.96 | 33.3 | 1.14 | 0.81 | 28.9 |
| Log-add SER | 2.79 | 2.17 | 22.2 | 3.65 | 2.47 | 32.3 | 2.90 | 2.06 | 29.0 |
| Log-nrm WER | 1.07 | 0.93 | 13.1 | 1.42 | 0.94 | 33.8 | 1.11 | 0.84 | 24.3 |
| Log-nrm SER | 2.75 | 2.31 | 16.0 | 3.61 | 2.42 | 33.0 | 2.79 | 2.09 | 25.1 |

The observation vectors consist of mel-frequency cepstral coefficients (MFCC) along with their regression-based first-order time derivative, derived at a frame rate of 20 ms. Three types of parameters are tested in the experiments:

DFT-MFCC-13 The power spectrum is calculated by DFT, 13 MFCC coefficients.

LPC-MFCC-13 The power spectrum is calculated through LPC analysis, 13 MFCC coefficients.

DFT-MFCC-10 The power spectrum is calculated by DFT, 10 MFCC coefficients.

Dynamic parameters are calculated using linear-regression.

We use Gaussian mixture HMM recognizer, with a maximum of 8 mixture per state. The speaker-independent (SI) word error rate (WER) for clean speech is 0.52%.

[1] We report results of noisy speech recognition by PMC, with speaker-adapted models. The speaker-adapted models are obtained by MLLR from the SI model set. (See C. J. Leggetter and P. C. Woodland. Maximum likelihood linear regression for speaker adaptation of continuous density HMMs. *Computer; Speech and Language*, 9(2):171–185, 1995.) The MLLR uses ten utterances from each test speaker, that are reserved for MLLR adaptation and not used for testing.

Both static and dynamic parameters are used in all tests, with two adaptation tests S: Only static parameters are adapted.

S+D: Both static and dynamic parameters are adapted.

The results are shown in Table-1.

Log-add approximation, with dynamic parameters or not, gives comparable results than log-normal at a substantially lower computational cost.

With static (only) parameter adaptation, LPC-MFCC gives slightly lower WER than DFT MFCC.

With static and dynamic parameter adaptation, DFT MFCC gives about 10% lower WER than LPC-MFCC DFF-MFCC-10 benefits the most dynamic parameter adaptation, with an error reduction of about 30%.

DFT MFCC-13 gives 10–20% lower WER than DFT MFCC-10. With log-add approximation, the lowest WER obtained is 0.81% (SER 2.06% 0).

What is claimed is:

1. A method of adaptation of log-spectral parameters comprises the steps of: providing quiet speech models with a clean speech mean vector $\mu^{log}$ having a static part and a dynamic part; providing noise models with a noise mean vector $\mu^{log}$ having a static part and a dynamic part; and comparing the speech vector having a static part and a dynamic part to the noisy vector having the static part and dynamic part to determine if log $g+\mu^{log}$ is greater than $\mu^{log}$ where g accounts for the gain of speech produced in noise with respect to clean speech and if so the static part is equal to log $g+\mu^{log}$ and the dynamic parameter is $\Delta\mu^{log}$ and if not greater than $\mu^{log}$ then the static part equals $\mu^{log}$ and the dynamic part is zero.

2. A method of speech recognition in a noisy environment comprising the steps of: providing adaptation models comprising the steps of:

providing quiet speech models with a clean speech mean vector $\mu^{log}$ having a static part and a dynamic part;

providing noise models for the noisy environment with a noise mean vector $\mu^{log}$ having a static part and a dynamic part; and comparing the speech vector having a static part and a dynamic part to the noisy vector having the static part and dynamic part to determine if log $g+\mu^{log}$ is greater than $\mu^{log}$, where g accounts for the gain of speech produced in noise with respect to clean speech and if so the static part of the adaptation model is equal to log $g+\mu^{log}$ and the dynamic parameter of the adaptation model is equal to $\Delta\mu^{log}$ and if not greater than $\mu^{log}$ then the static part of the adaptation model equals $\mu^{log}$ and the dynamic part of the adaptation model is zero; and using said adaptation models in a recognizer to recognize input speech in the noisy environment.

3. A method of adaptation of log-spectral parameters comprises the steps of: providing quiet speech models with a mean vector $\mu^{log}$ having a static part and a dynamic part; providing noise models with a noise mean vector $\mu^{log}$ having a static part and a dynamic part; and comparing the speech vector having a static part to the noisy vector having the static part to determine if log $g+\mu^{log}$ is greater than $\mu^{log}$ where g accounts for the gain of speech produced in noise with respect to clean speech and if so the static part is equal to log $g+\mu^{log}$ and if not greater than $\mu^{log}$ then the static part equals $\mu^{log}$.

4. A system for speech recognition comprising:

a speech recognizer adapted to receive input speech in a noisy condition; and speech recognition models adapted to noisy speech from quiet speech by comparing the speech vector $\mu^{log}$ having a static part and a dynamic part to the noisy vector $\mu^{log}$ having the static part and dynamic part to determine if log $g+\mu^{log}$ is greater than $\mu^{log}$ where g accounts for the gain of speech produced in noise with respect to clean speech and if so the static part of the adaptation model is equal to log $g+\mu^{log}$ and for the dynamic parameter of the adaptation model is equal to $\Delta\mu^{log}$ and if not greater than $\mu^{log}$ then the static part of the adaptation model equals $\mu^{log}$ and the dynamic part of the adaptation model is zero.

5. A method of adaptation of log-spectral parameters comprising the steps of: providing quiet speech models with a mean vector having a static part and a dynamic part;providing noise models with a noisy mean vector having a static part and a dynamic part;and comparing the speech vector to the noisy vector to determine if the quiet vector plus the gain of speech produced in noise with respect to clean speech is greater than the noisy mean vector and if so the static part is equal to the gain plus the clean speech vector and the dynamic part is the change in the quiet speech vector and if not greater than the noise vector then the static part equals the noise vector and the dynamic part is zero.

* * * * *